(12) United States Patent  (10) Patent No.: US 8,924,631 B2
Ng et al.  (45) Date of Patent: Dec. 30, 2014

(54) METHOD AND SYSTEM FOR RANDOM WRITE UNALIGNMENT HANDLING

(75) Inventors: King Ying Ng, San Jose, CA (US);
Marielle Bundukin, Hayward, CA (US);
Paul Lassa, Cupertino, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/233,540

(22) Filed: Sep. 15, 2011

(65) Prior Publication Data

US 2013/0073784 A1    Mar. 21, 2013

(51) Int. Cl.
*G06F 12/00* (2006.01)
*G06F 12/02* (2006.01)
*G06F 12/04* (2006.01)

(52) U.S. Cl.
CPC ............ *G06F 12/0246* (2013.01); *G06F 12/04* (2013.01); *G06F 2212/7203* (2013.01); *G06F 2212/7208* (2013.01)
USPC ........................................................ 711/103

(58) Field of Classification Search
USPC ............................ 711/103, 154, 201, E12.001
See application file for complete search history.

(56) References Cited

U.S. PATENT DOCUMENTS

| 7,395,404 | B2 * | 7/2008 | Gorobets et al. | 711/201 |
| 8,291,190 | B2 * | 10/2012 | Watanabe et al. | 711/172 |
| 2005/0144416 | A1 * | 6/2005 | Lin | 711/201 |
| 2006/0036817 | A1 | 2/2006 | Oza et al. | |
| 2009/0113218 | A1 | 4/2009 | Dolgunov et al. | |
| 2010/0153611 | A1 | 6/2010 | Rau | |
| 2010/0287330 | A1 * | 11/2010 | Su et al. | 711/103 |
| 2012/0131286 | A1 * | 5/2012 | Faith et al. | 711/154 |
| 2013/0007381 | A1 * | 1/2013 | Palmer | 711/154 |

* cited by examiner

*Primary Examiner* — April Y Blair
*Assistant Examiner* — Trang Ta
(74) *Attorney, Agent, or Firm* — Brinks Gilson & Lione

(57) ABSTRACT

A method and system are disclosed for handling host write commands associated with both data aligned with physical page boundaries of parallel write increments in non-volatile storage areas in a non-volatile storage device and data unaligned with the physical page boundaries. The method may include a controller of a storage device identifying the aligned and unaligned portions of received data, temporarily storing the aligned and unaligned portions in different queues, and then writing portions from the unaligned data queue or the aligned data queue in parallel to the non-volatile memory areas when one of the queues has been filled with a threshold amount of data or when the controller detects a timeout condition. The system may include a storage device with a controller configured to perform the method noted above, where the non-volatile memory areas may be separate banks and the queues are random access memory.

21 Claims, 7 Drawing Sheets

METHOD AND SYSTEM FOR RANDOM WRITE UNALIGNMENT HANDLING

TECHNICAL FIELD

This application relates generally to a method and system for managing the storage of data in a data storage device.

BACKGROUND

Non-volatile memory systems, such as flash memory, are used in digital computing systems as a means to store data and have been widely adopted for use in consumer products. Flash memory may be found in different forms, for example in the form of a portable memory card that can be carried between host devices or as a solid state disk (SSD) embedded in a host device. These memory systems typically work with data units called "pages" that can be written, and groups of pages called "blocks" that can be read and erased, by a storage manager often residing in the memory system.

A non-volatile memory system may operate very efficiently when data received from the host arrives in groups aligned with the physical page size that the memory system handles. In typical applications, however, data is often received by memory systems in bursts of random lengths that do not neatly arrive in groups sized to match the page size or align with the page boundary of the memory system. When such random length data is received at a non-volatile memory system, where a mix of data that falls within one or more physical page divisions and data that is not aligned with the physical page divisions, the memory system may not be able to efficiently write data in parallel to different portions of the memory.

BRIEF SUMMARY

In order to address the problems and challenges noted above, a system and method for handling host write commands for random unaligned data is disclosed.

According to a first aspect, a method for managing a storage device is disclosed. The method includes, in a storage device having a plurality of non-volatile memory areas in communication with a controller, the controller receiving a write command from a host, where the write command is associated with an amount of data greater than a physical page and less than an integer number of physical pages of the non-volatile memory areas of the storage device. The controller identifies an unaligned portion of the data, the unaligned portion having data not aligned with the physical page of the non-volatile memory areas. The controller stores the unaligned portion in a first queue in the storage device. The controller further stores portions of the data aligned with the physical page of the non-volatile portion of the data in a second queue in the storage device. In one embodiment, the method may then include, when either queue contains a threshold amount of data or upon detection of a timeout condition, the controller writing data portions from a queue to each of the plurality of nonvolatile storage areas in parallel. In another embodiment, the queues may include separate lists each dedicated to a respective one of the plurality of non-volatile storage areas and the processor may store received data in the appropriate list in the appropriate queue (aligned or unaligned) and then later write from the appropriate list to the associated non-volatile storage area in parallel.

In another aspect, a storage device is disclosed. The storage device may include a memory having plurality of non-volatile memory areas, a random access memory (RAM), and a controller in communication with the memory and the RAM. The controller may be configured to receive a write command from a host, where the write command is associated with an amount of data greater than a physical page and less than an integer number of physical pages of the non-volatile memory areas. The controller may further be configured to identify an unaligned portion of the data, where the unaligned portion including data not aligned with the physical page of the non-volatile memory areas of the memory, store the unaligned portion in a first queue in the RAM of the storage device, and store portions of the data aligned with the physical page of the non-volatile memory areas in a second queue in the RAM of the storage device.

DETAILED DESCRIPTION

Figure 1:
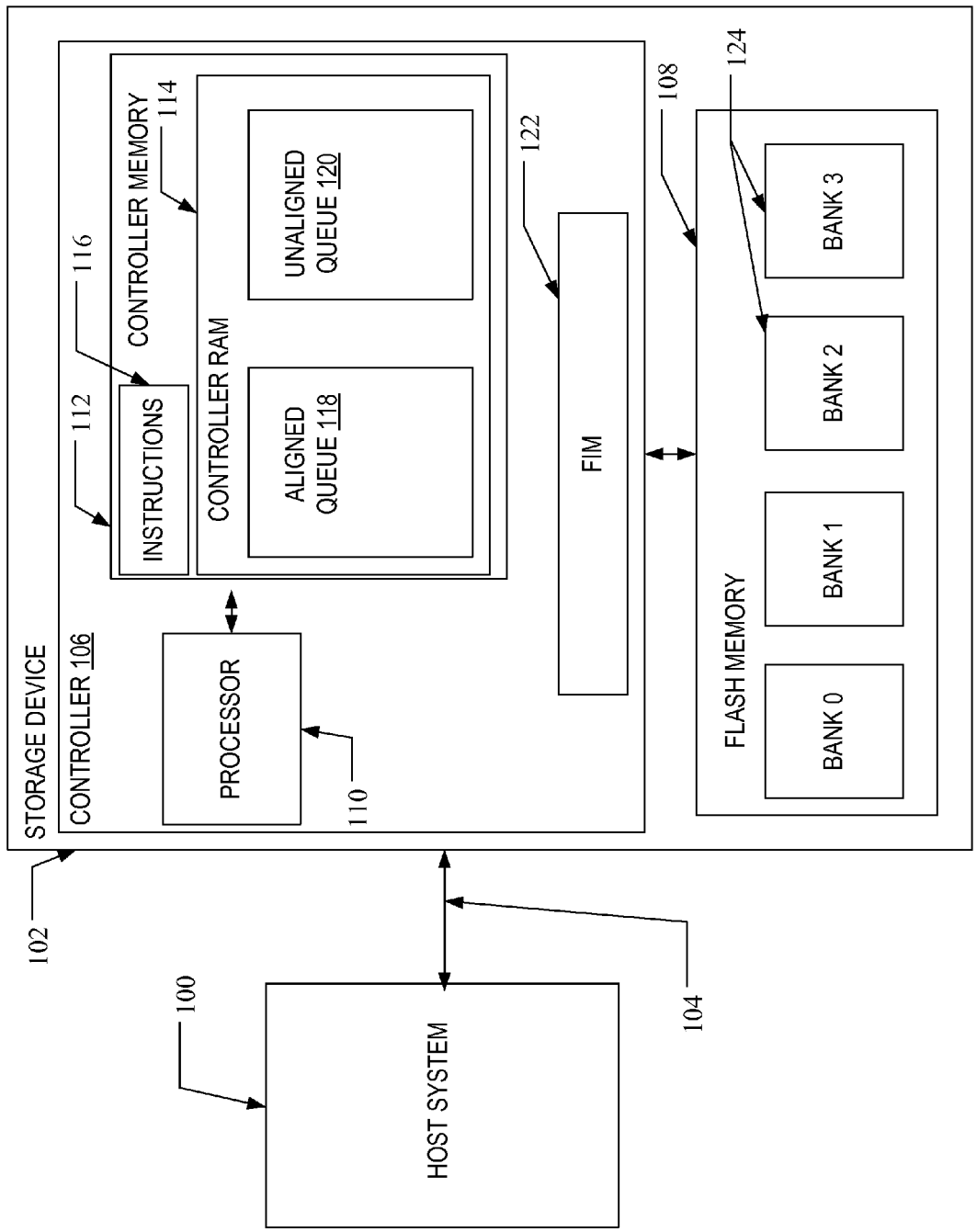
FIG. 1 illustrates a block diagram of a storage device and host according to one embodiment.

A flash memory system suitable for use in implementing aspects of the invention is shown in FIG. 1. A host system 100 stores data into, and retrieves data from, a storage device 102. The storage device 102 may be embedded in the host system 100 or may exist in the form of a card or other removable drive, such as a solid state disk (SSD) that is removably connected to the host system 100 through a mechanical and electrical connector. The host system 100 may be any of a number of fixed or portable data generating devices, such as a personal computer, a mobile telephone, a personal digital assistant (PDA), or the like. The host system 100 communicates with the storage device over a communication channel 104.

The storage device 102 contains a controller 106 and a memory 108. As shown in FIG. 1, the controller 106 includes a processor 110 and a controller memory 112. The processor 110 may comprise a microprocessor, a microcontroller, an application specific integrated circuit (ASIC), a field programmable gate array, a logical digital circuit, or other now known or later developed logical processing capability. The controller memory 112 may include volatile memory such as random access memory (RAM) 114 and/or non-volatile memory, and processor executable instructions 116 for handling memory management.

As discussed in more detail below, the storage device 102 may include functions for memory management. In operation, the processor 110 may execute memory management instructions (which may be resident in instructions 116) for operation of the memory management functions. The memory management functions may control the assignment of the one or more portions of the memory within storage device 102, such as controller memory 112. For example, memory management functions may allocate a portion of controller memory 112 for a data cache. One, some, or all of the memory management functions may be performed by one or separate elements within the storage device 102. The controller RAM 114 may include two data cache areas for data queues for use in optimizing write performance. As explained in greater detail below, an aligned data queue 118 in the controller RAM 114 may be configured to cache portions of data from host data writes that are complete pages aligned with bank page boundaries in the flash memory. An unaligned data queue 120 in the controller RAM 114 may be configured to cache portions of data from host data writes that contain data that do not make up the size of a complete bank page and thus not aligned with bank page boundaries in the flash memory 108. The controller 106 may also include one of more flash interface modules (FIMs) 122 for communicating between the controller 106 and the flash memory 108.

The flash memory 108 is non-volatile memory and may consist of one or more memory types. These memory types may include, without limitation, memory having a single level cell (SLC) type of flash configuration and multi-level cell (MLC) type flash memory configuration. The flash memory 108 may be divided into multiple banks 124. Although the banks are preferably the same size, in other embodiments they may have different sizes. The storage device may be arranged to have a different FIM designated for each bank, or more than one bank associated with a FIM. Each bank 124 may include one or more physical die, and each die may have more than one plane.

Figure 2:
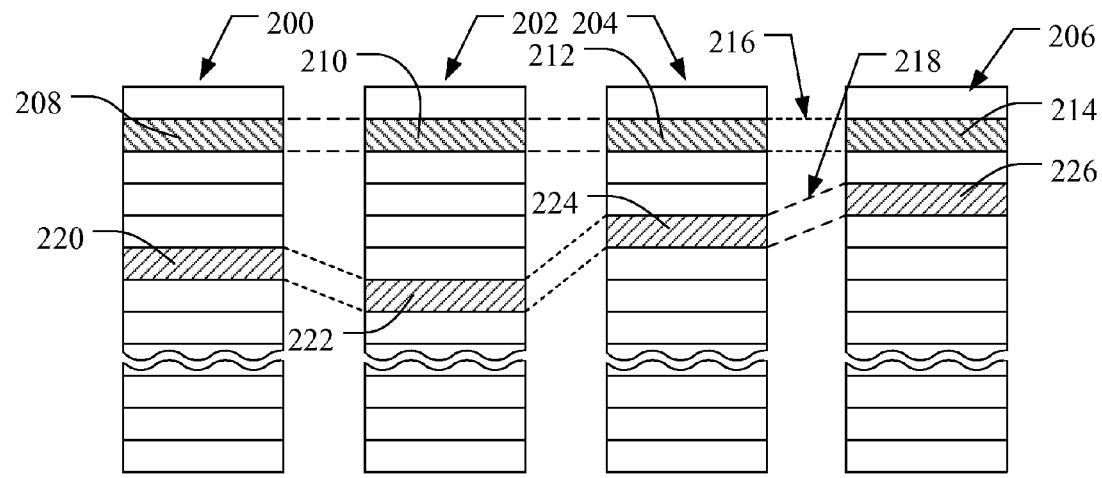
FIG. 2 illustrates an example physical memory organization of a memory bank of FIG. 1.

Each bank 124 of the flash memory 108 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 2, a conceptual illustration of a bank 124 of a representative flash memory cell array is shown. Four planes or sub-arrays 200, 202, 204 and 206 of memory cells may be on a single integrated memory cell chip (also referred to as a die), on two chips (two of the planes on each chip) or on four separate chips. The specific arrangement is not important to the discussion below and other numbers of planes may exist in a system. The planes are individually divided into blocks of memory cells shown in FIG. 2 by rectangles, such as blocks 208, 210, 212 and 214, located in respective planes 200, 202, 204 and 206. There may be dozens or hundreds of blocks in each plane. Blocks may be logically linked together to form a metablock that may be erased as a single unit. For example, blocks 208, 210, 212 and 214 may form a first metablock 216. The blocks used to form a metablock need not be restricted to the same relative locations within their respective planes, as is shown in the second metablock 218 made up of blocks 220, 222, 224 and 226.

Figure 3:
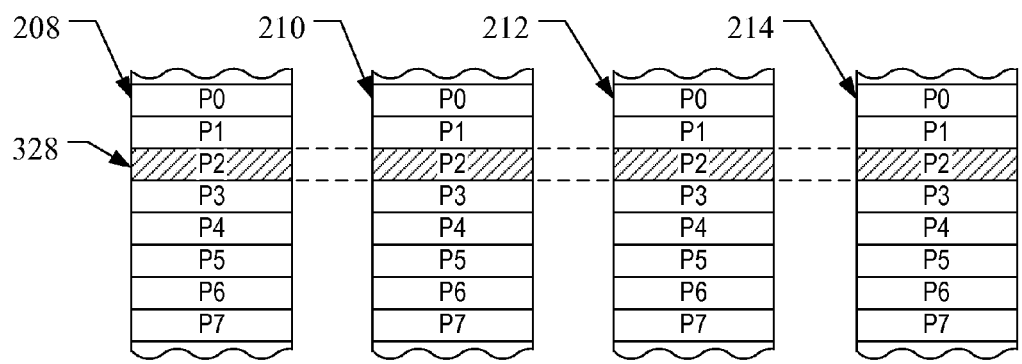
FIG. 3 shows an expanded view of a portion of the physical memory of FIG. 2.

The individual blocks are in turn divided for operational purposes into pages of memory cells, as illustrated in FIG. 3. The memory cells of each of blocks 208, 210, 212, and 214, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 328 is illustrated in FIG. 3 as formed of one physical page for each of the four blocks 208, 210, 212 and 214. The metapage 328 includes the page P2 in each of the four blocks but the pages of a metapage need not necessarily have the same relative position within each of the blocks. A metapage is the maximum unit of programming. The blocks disclosed in FIGS. 2-3 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host 100. The LBAs are then mapped to one or more physical blocks in the storage device 102 where the data is physically stored.

Figure 4:
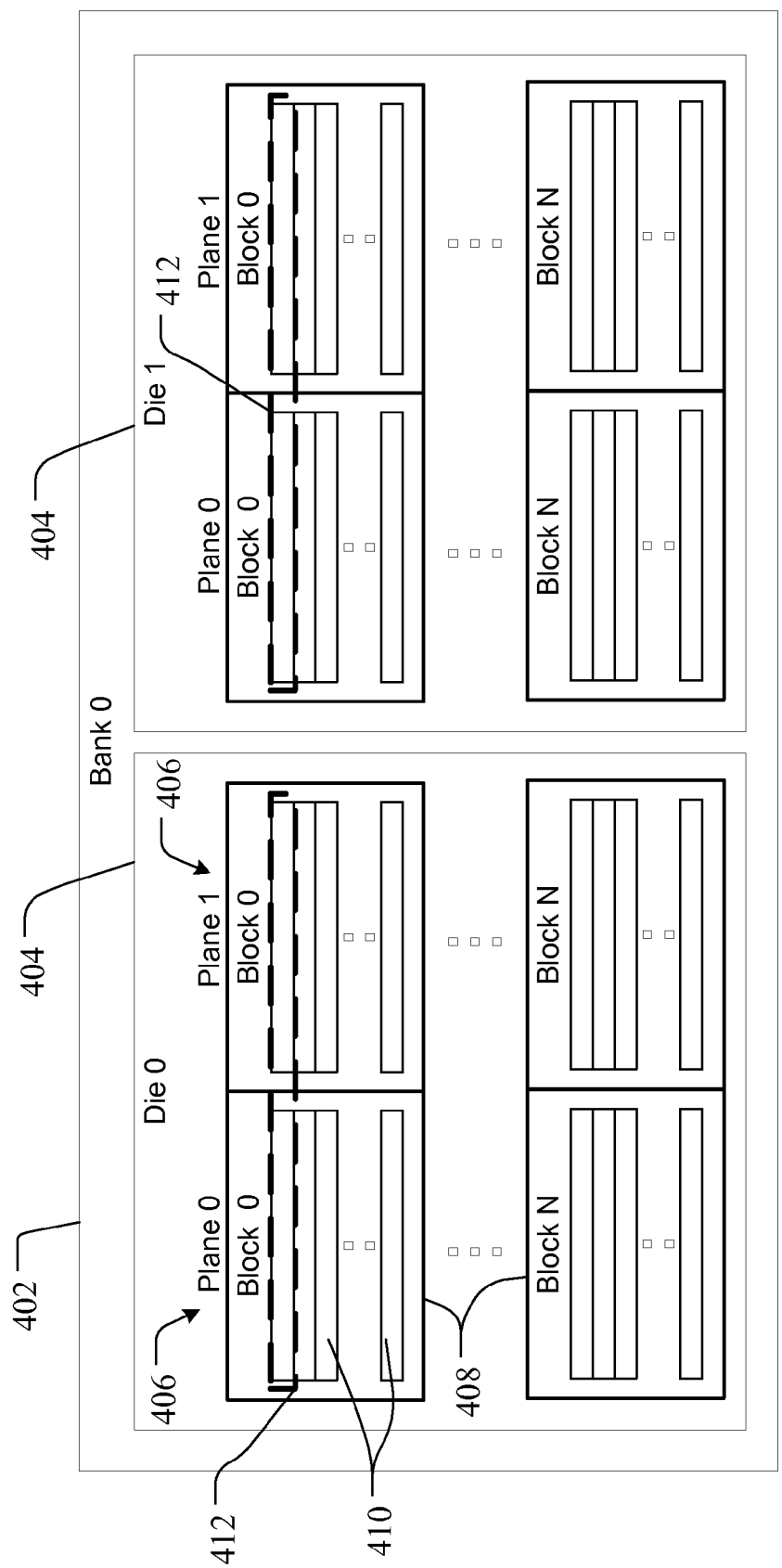
FIG. 4 illustrates an example physical structure of a memory bank of the memory of FIG. 1.
Figure 5:
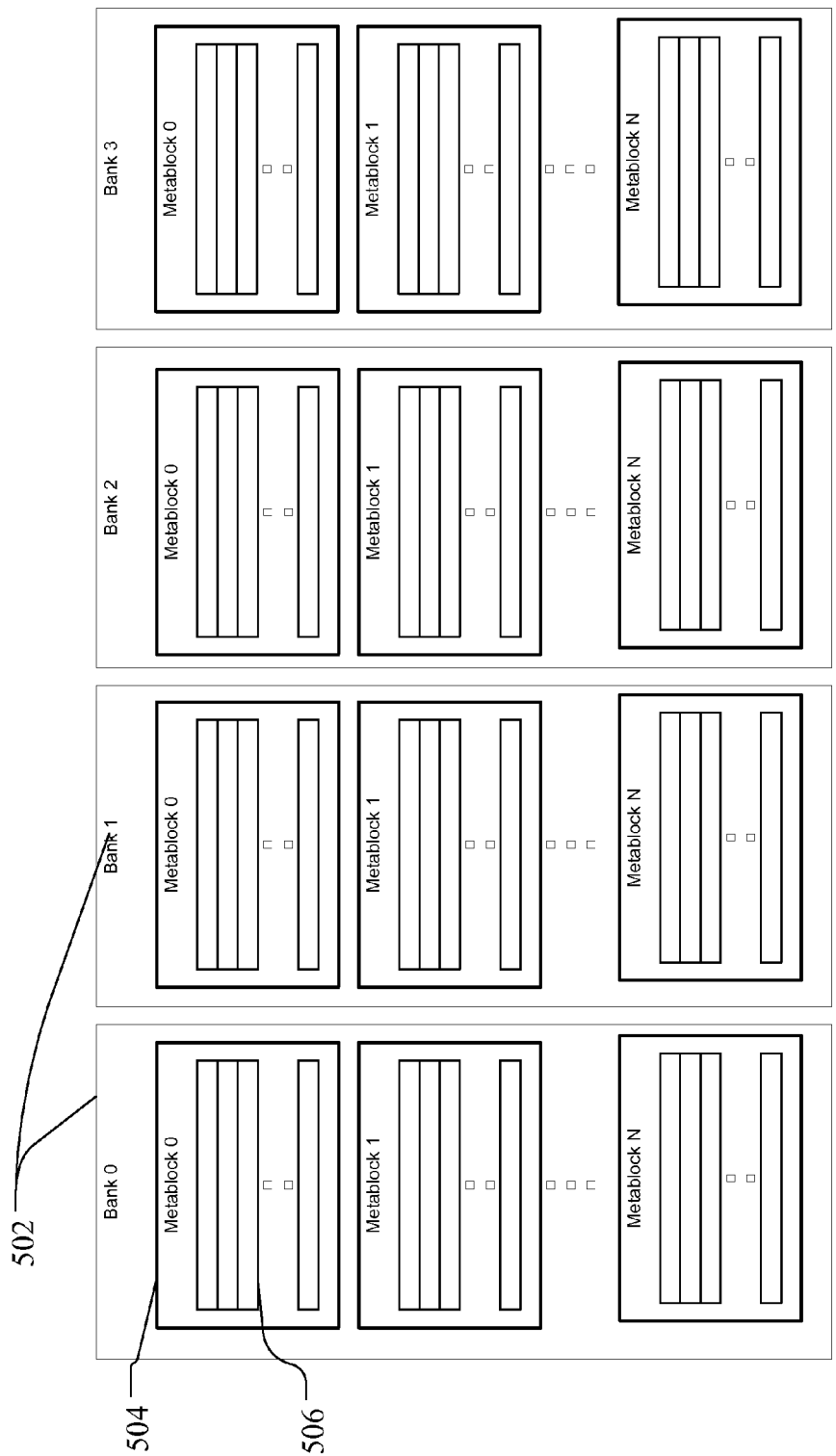
FIG. 5 illustrates and embodiment of the physical structure of the memory banks of FIG. 1.

FIG. 4 illustrates one of the possible configurations noted above for the four plane bank of FIG. 3. In FIG. 4, the bank 402 has two separate die 404, where each die includes two planes 406. Each plane 406 includes multiple blocks 408, and each block includes multiple pages 410. The bank 402 may be configured to handle write operations in increments of a page 410, a metapage that includes one page in each plane of one of the die 404 (also referred to as a die page 412), a metapage that includes two die pages 412 (one from each die in the bank) or any of a number of other increments. In different implementations, the number of die per bank and plane per die may be varied. FIG. 5 illustrates a memory 500 that is another, slightly more generic, representation of the memory 108 of FIG. 1. Each of the banks 502 may be configured as the bank described in FIG. 4 or in other combinations. The banks 502 in FIG. 5 are shown as divided into multiple metablocks 504 that each include multiple metapages 506. The metablocks may include blocks from multiple die in a bank and the metapages may include pages from each of the blocks as discussed above.

Figure 6:
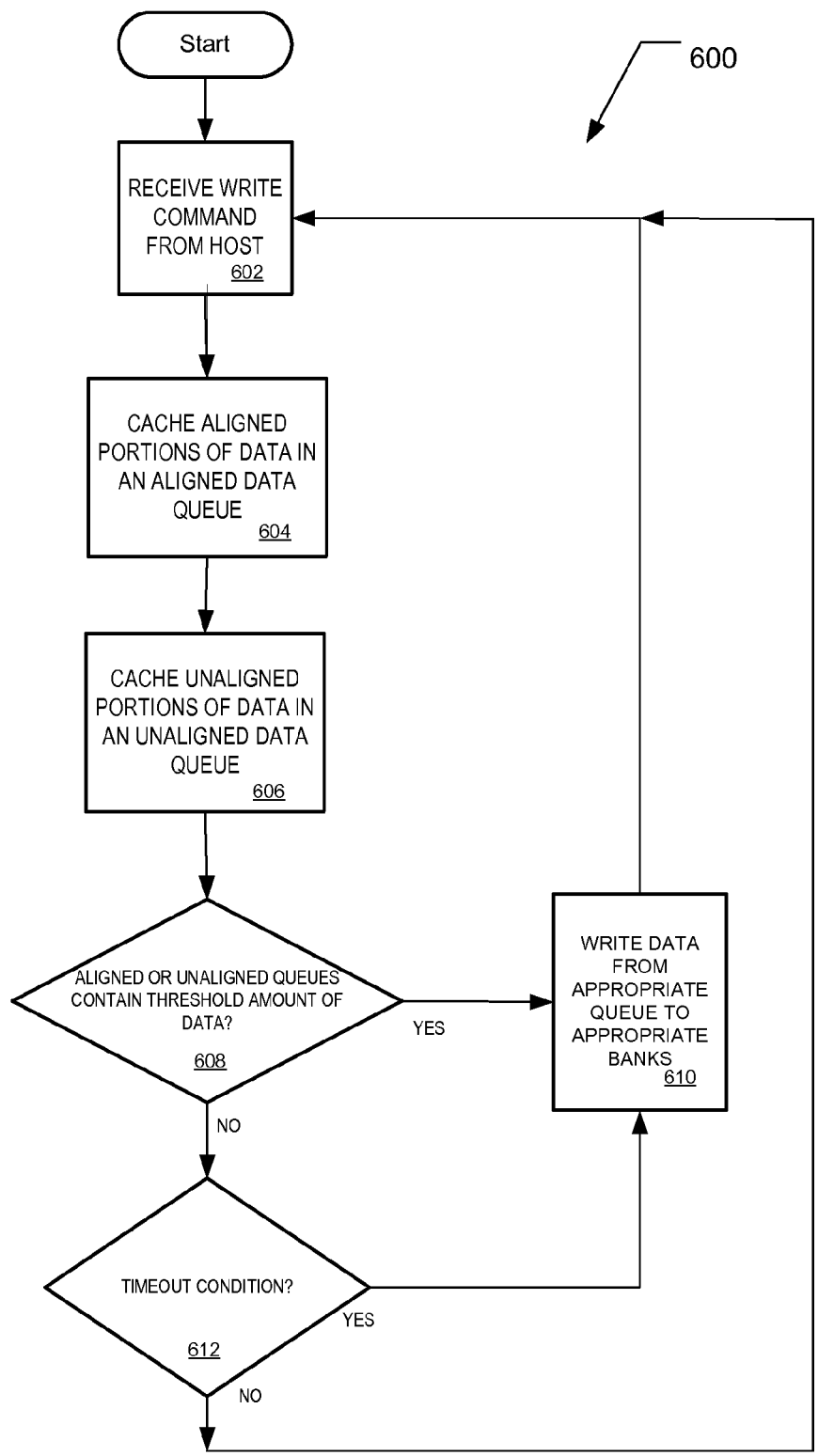
FIG. 6 is a flow chart of a method of handling host write commands containing both unaligned and aligned data.

Using a storage device 102 with memory 108 as described above, a method 600 of handling random host data writes may be implemented such as set forth in FIG. 6. The controller 106 of the storage device 102 receives a host write command from the host 100 that is associated with data to be stored in the memory 108 (at 602). If the host write command is for a random write, where the amount of data associated with the write command is greater than a physical page, less than an integer number of physical pages of the memory of the storage device, and not aligned with the physical page boundaries of a physical page or whole number of physical pages, then the controller divides up the data associated with the command into portions that are aligned with physical page boundaries and portions that are not aligned with physical page boundaries. The controller 106 is aware of the physical page boundaries (or other parallel write increment) managed by the storage device and of a logical-to-physical mapping table for the memory. Accordingly, the controller may use the LBAs of the data associated with the host write command to divide the incoming data into aligned and unaligned portions.

The aligned portions are cached in a first queue 118 in the controller random access memory (RAM) 114 and the unaligned portions are cached in a second queue area 120 of the controller RAM 114 (at 604, 606). The steps of identifying and caching the aligned portions and identifying and caching the unaligned portions may be accomplished concurrently, where the incoming data is simply identified and routed to the appropriate queue as it is received. In instances where a host write command is received for data that is unaligned and less than a physical page, that data is all placed in the second queue 120.

As indicated in FIG. 6, two instances when the controller 106 will write data that has been divided up and stored in the queues to appropriate bank (or other parallel writing increment) in the flash memory 108 include: 1) when one of the queues has received a threshold amount of data and is thus too full to take any more data; and 2) when the controller detects a timeout condition where no host commands are pending. Accordingly, if the aligned data queue and unaligned data queue have less than a threshold amount of data (at 608), then the controller will only write data from one of the queues at a time to the flash memory if a timeout condition is detected (at 612, 610). If the unaligned or aligned queues 118, 120 are too full, however, the controller 106 will write data from the area (aligned data queue or unaligned data queue) in the controller RAM 114 that is too full to whatever banks the data is destined for regardless of the fact that less than all the banks would be written to in parallel (at 608, 610). It is expected that, in typical situations, the distribution of data in the queues will be such that data will likely be available for writing into each of the banks (or other parallel write increment supported) when a queue reaches the threshold fullness.

The threshold fullness of the data queues in the controller RAM may be set to any predetermined amount. For example, the controller may be configured to write data from either queue when the aligned or unaligned queue areas only have 20% capacity remaining. The threshold may be the same or different for each of the unaligned and aligned data queue areas in the controller RAM. Assuming that the queues have not reached their threshold fullness, the controller processes more write commands and associated data (at 602). Additionally, regardless of the status of the queues, if the controller detects a timeout condition, for example if the host is idle and has not sent a command to the storage device for some predetermined amount of time, the controller will write the data in the queues to the appropriate banks. Given a threshold level set at 20% remaining capacity, or any other remaining capacity threshold level greater than zero, the controller 106 can write data from a queue to the banks concurrently with receiving host data and writing the newly received data to the queue.

Figure 7:
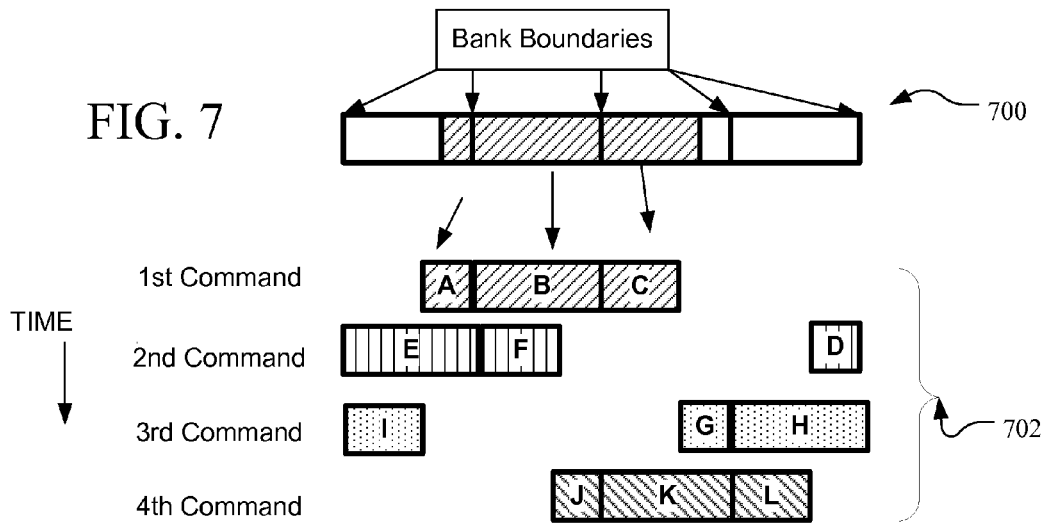
FIG. 7 is a diagram of random write command data bursts in relation to physical page boundaries of a flash memory.

A more detailed example of an implementation of the method of FIG. 6 is found in FIGS. 7-10. Referring to FIG. 7, the data associated with four consecutive host write commands 702 is illustrated in relation to where the data addresses associated with the data would place the data along bank boundaries 700 in a four bank memory such as illustrated in FIG. 1. In this example it is assumed that data in each write command is sequential. The same amount of data in each command, as well as the particular alignment of data from one command to a subsequent command, is shown merely for convenience of this illustration. Although the data within a given host write command should be sequential, the length of data and the alignment of data from one command to the next may vary between commands in other implementations.

Figure 8:
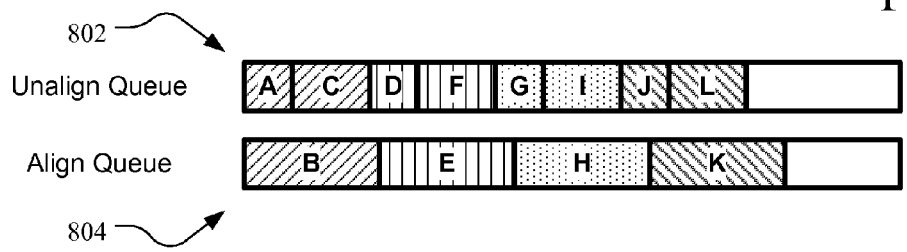
FIG. 8 shows an example unaligned queue and aligned queues in RAM cache memory with unaligned data in the unaligned queue and aligned data in the aligned queue.

The data associated with each of the commands in FIG. 7 is shown under a sample four bank reference 700 illustrating associated bank boundaries. Upon receipt of the first host write command, the controller identifies that the data can be broken up into two portions (A and C) that are less than a complete bank page and one portion (B) that includes data for a range of addresses mapped to a complete and aligned bank page. The controller then routes the unaligned portions, A and C, to an unaligned data queue 802 and the aligned portion, B, to the aligned data queue 804 as shown in FIG. 8. The unaligned and aligned data queues 802, 804 correspond to the unaligned and aligned data queues 118, 120 in the controller RAM 114 of the storage device 102.

The second write command is associated with a run of sequential data that starts at the beginning of portion D and ends at the end of portion F. The storage device 102 receives the data associated with the second command as a single run of data and the controller identifies that the data may be broken into three portions (D,E and F) based on where the data would be mapped into the physical memory, and therefore based on where page boundaries for the bank pages would fall. As with the identified portions of data associated with the first write command, the identified portions of data associated with the second command are stored in the appropriate queue 802, 804. The process is repeated for each of the subsequent three write commands received at the storage device shown in FIG. 7.

Figure 9:
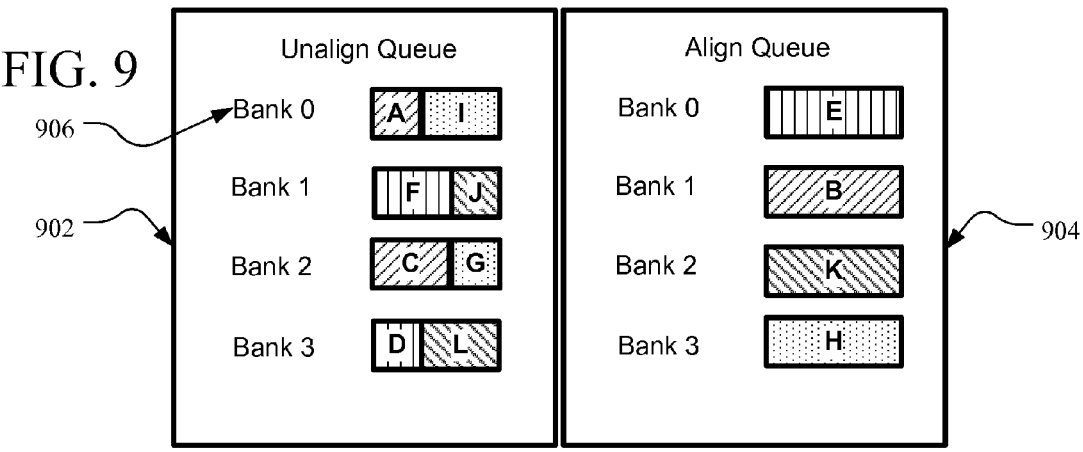
FIG. 9 is an alternative embodiment of the queues of FIG. 8.

The queues 802, 804 illustrate an implementation where unaligned data and aligned data, regardless of what bank page they are destined for, are placed in one of two queues. In another implementation, such as shown in FIG. 9, the unalign and align queues 902, 904 may be further divided into lists for each bank. Thus, the portions of data labeled A and I in the first and third commands of FIG. 7, which both are destined for Bank 0 in the memory and are both unaligned with bank page boundaries, would be directed to a Bank 0 list 906 within the unalign queue 902. The aligned data would likewise be routed by the controller to the appropriate list in the align queue 904. For example the first aligned portion of data, B, that arrives in the first command, would be routed to the list for Bank 1 908 because the B portion of data is a full bank page and fully aligned with the boundaries of Bank 1. An advantage to configuring the align and unaligned queues in controller RAM into separate lists for each bank is the ability to quickly retrieve the data portions when it is time to write the data portions into the respective memory bank pages.

After data portions are received in one of the queues for each of the banks, in this example data for all or a portion of a physical metapage that spans an entire bank and referred to herein as a bank page, the controller then selects the first data portion in the queue for each of the banks and sends the data from the controller RAM to the respective banks in parallel. The example of queues 902, 904 in FIG. 9 are only shown with a limited amount of data for ease of illustration. The actual queue capacity is dependent on the desired application but is preferably at least sized so that each queue is capable of holding no less than an amount of data equal to that which the storage device is capable of writing in parallel. In the example of FIGS. 7-9, the parallel write increments are bank pages and there are four banks, so the minimum queue capacity for each queue is preferably four bank pages. An advantage of having the queues each sized to no less than this minimum size is that there is always a possibility of having data in the queues that can be written to each of the banks in parallel to maximize efficiency.

Figure 10:
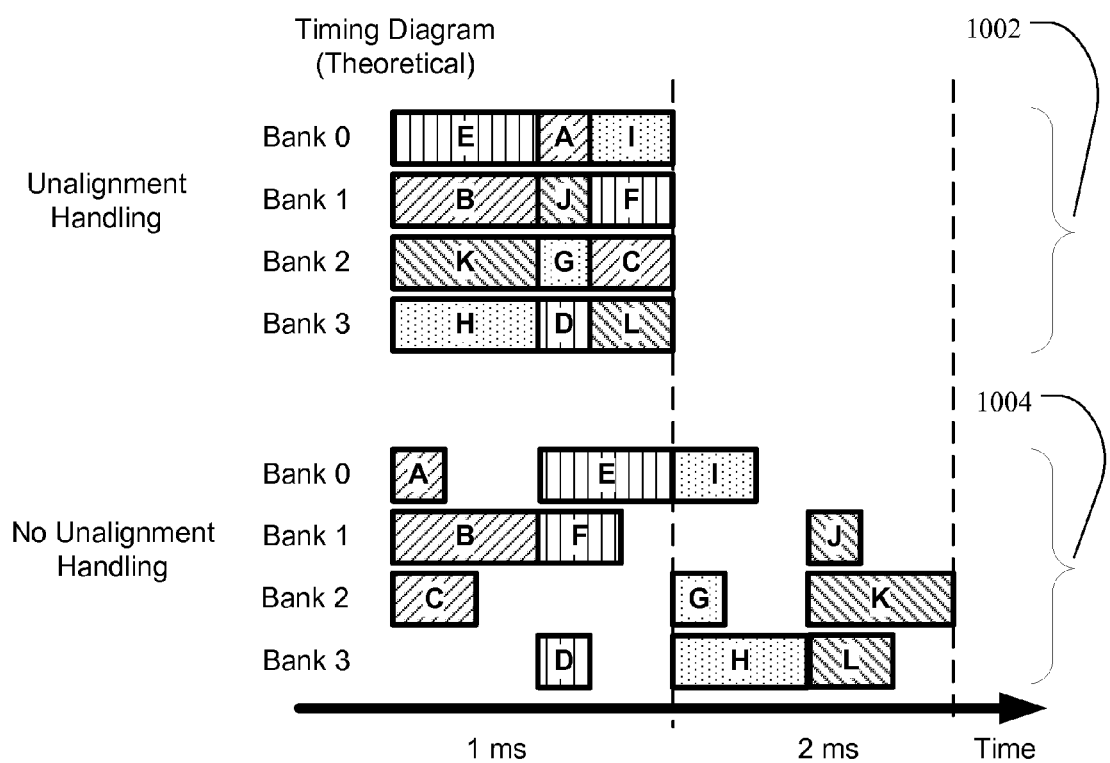
FIG. 10 is a hypothetical timing diagram illustrating writing data to a memory using an embodiment of the method of FIG. 6 in comparison to writing data without the method of FIG. 6.

Referring now to FIG. 10, a hypothetical timing diagram is shown that illustrates a write operation from the queues 118, 120 in controller RAM to the banks in flash memory according to one embodiment. As shown in FIG. 10 at the unalignment method example (1002), and referring to the host write commands and queues of FIGS. 7 and 9, the controller first sends data portions from the align queue 904 to the FIMs in the storage device. Each of the banks is written to in parallel. The controller then writes unaligned portions of data into each of the banks for further parallel write operations in each of the four banks. In one embodiment, the controller only writes from one queue at a time. For example, the first queue (aligned or unaligned) to reach its fullness threshold is written from first until other queue reaches its fullness threshold. At that point the write activity from the first queue to flash memory is interrupted and the other queue has data written into flash. In other embodiments, the controller may take data from both queues at the same time or purposely alternate which queue data is written to flash from in predetermined sequences, times or amounts. The writing from the queues to the banks via the FIMs may be executed in parallel with receiving more data commands and dividing the received data into the appropriate queues and lists within the queues. Also, the writing from the queues to the banks may be implemented using a first-in-first-out (FIFO) technique by portion and by bank as illustrated in the unaligned data handling example 1002 of FIG. 10. Accordingly, in this example the first aligned queue portion for each bank is written to each bank in parallel, followed by the first unaligned data portion received for each bank. Here the first unaligned portion for each bank would be portions A, D, G, and J.

In alternative embodiments, the controller may write data from one or both queues using a FIFO technique or in a manner to optimize parallel write operations to all banks (or other parallel write increments). For example, the controller may be configured to select data from a queue intended for each of the different banks, rather than simply write data from the queue in the order received, so that data may be written in parallel to all the banks and efficiency is improved. The technique of selecting data from the queues that allow maximum parallel writes, rather than writing the data from the queues in a FIFO manner, may apply to situations where a queue has received the threshold amount of data (see step 608 in FIG. 6) or during a timeout condition (see step 612 in FIG. 6). In yet other embodiments, one queue may be written from in a FIFO manner and the other in a parallel write optimized manner.

An advantage of queuing the aligned and unaligned portions of data in random host writes, and then writing to the banks in parallel, is that the write performance may be improved. For example, a hypothetical timing diagram for writing data directly to the flash memory banks using the same host write command sequence shown in FIG. 7, but without the method described above, would typically involve writing the data to the banks in the order received. In the hypothetical standard write process 1004 shown in FIG. 10, this could lead to writes for the same data taking twice as long as a write using the method described herein. In the hypothetical standard writing process 1004, the writing of data associated with a host write command one command at a time in the order received next may leave certain banks inactive during each write cycle. For example, Bank 3 is inactive in the standard process 1004 while Banks 0-2 are being written to in response to the first host write command. Also, the standard write process 1004 can lead to wasted time between host write commands because full page writes, such as portion B to Bank 1, may be happening in parallel with shorter writes, such as portion A in Bank 0, and the remaining banks will be idle after completing shorter data writes until the full page write is completed and the next host write command can be addressed.

The method and system described above for handling random host writes with mixed aligned and unaligned portions of data may be scaled to any of a number of physical page sizes. Although the example provided herein was of a system where a bank page was the parallel write increment managed by the storage device, the same principles may be applied to smaller page sizes within a bank of a multi-bank memory such as shown, such as a die page level, or any multiple of individual physical pages within a single bank as long as it is the parallel write increment that the storage device uses to write in parallel to flash memory. The method and system may be scaled such that the data is parsed into the aligned and unaligned queues in whatever parallel write increment is being used in the storage device (bank page, die page, single physical page, etc.). The queues 118, 120 may be stored in controller RAM as described, in external RAM, or other volatile memory.

A system and method has been disclosed for improving write performance in a storage device when host write commands containing mixed aligned and unaligned data are received. According to one embodiment a controller of the storage device is configured to identify aligned and unaligned data portions in a host write command and store the unaligned and aligned data in separate queues in RAM. The queues may be further divided into lists of data destined for particular bank pages, or whatever other granularity of physical page (parallel write increment) the memory of the storage device is using. When a queue reaches a threshold fullness, or a timeout condition is detected, data is written to the flash memory such that aligned data for each bank page (or other physical page size utilized) is written in parallel to each bank, or unaligned data portions from the unaligned queue are written in parallel to each bank page. A storage device is also disclosed having a memory and a controller with processor configured to either to receive write commands and associated data from a host, divide up the aligned portions and unaligned portions of data in the command along physical page boundaries of the memory and place the portions into respective aligned and unaligned queues in controller RAM. The processor is configured to then, when a queue has reached a threshold fullness, or when a timeout condition is detected, write data portions from one of the queues in parallel to each of the banks.

It is therefore intended that the foregoing detailed description be regarded as illustrative rather than limiting, and that it be understood that it is the following claims, including all equivalents, that are intended to define the spirit and scope of this invention.

What is claimed is:

1. A method for managing a storage device having a plurality of non-volatile memory areas in communication with a controller, the method comprising the controller:

receiving a plurality of write commands from a host, at least some of the write commands associated with an amount of data greater than a physical page and less than an integer number of physical pages of the non-volatile memory areas of the storage device;

as each of the plurality of write commands is received from the host:
  identifying each unaligned portion of the data, wherein an unaligned portion comprises data not aligned with the physical page of the non-volatile memory areas of the memory;
  routing each unaligned portion to a first queue of a volatile memory in the storage device; and
  routing each aligned portion of the data, wherein an aligned portion comprises only data aligned with the physical page of the non-volatile memory areas, to a second queue of the volatile memory in the storage device, wherein the first queue is different than the second queue;

accumulating unaligned portions and aligned portions of data in the first queue and the second queue of the volatile memory, respectively, until a predetermined threshold is met; and upon reaching the predetermined threshold, writing unaligned portions of the data from the first queue, in parallel, to at least some of the plurality of non-volatile memory areas.

2. The method of claim 1, wherein the first queue comprises a plurality of separate lists of unaligned portions, each separate list of unaligned portions of data associated with a respective one of the plurality of non-volatile memory areas and wherein accumulating the unaligned portions comprises caching the unaligned portions in an appropriate one of the plurality of lists of the first queue associated with the non-volatile memory area to which the unaligned portion of data belongs.

3. The method of claim 2, wherein reaching the predetermined threshold comprises the controller detecting a timeout condition.

4. The method of claim 1, wherein the predetermined threshold comprises a predetermined fullness of the first queue, and wherein writing data from the first queue in parallel to an appropriate one or more of the plurality of non-volatile memory areas, regardless of whether the first queue contains unaligned data for all of the non-volatile memory areas, when an amount of unaligned data in the first queue reaches the predetermined threshold.

5. The method of claim 1, wherein the volatile memory comprises a RAM cache in the controller.

6. The method of claim 2, further comprising writing unaligned data from each of the lists, in parallel, to each of the respective plurality of non-volatile memory areas in a first in first out (FIFO) manner.

7. The method of claim 2, wherein the non-volatile memory areas comprise separate banks of flash memory.

8. The method of claim 7, wherein the physical page comprises a metapage spanning one of the plurality of banks of flash memory.

9. A storage device comprising:
a memory having plurality of non-volatile memory areas;
a random access memory (RAM); and
a controller in communication with the memory and the RAM, the controller configured to:
receive a write command from a host, the write command associated with an amount of data greater than a physical page and less than an integer number of physical pages of the non-volatile memory areas;
as the write command is received from the host:
identify any unaligned portion of the data, the unaligned portion comprising data not aligned with the physical page of the non-volatile memory areas of the memory;
route unaligned portions of the data to a first queue in the RAM of the storage device;
route aligned portions of the data to a second queue in the RAM of the storage device, wherein an aligned portion comprises only data aligned with the physical page of the non-volatile memory areas, wherein the first queue is different than the second queue;
accumulate unaligned portions and aligned portions of data in the first queue and the second queue of the volatile memory, respectively, until a predetermined threshold is met; and upon reaching the predetermined threshold, write the unaligned portion of the data from the first queue, in parallel, to at least some of the plurality of non-volatile memory areas.

10. The storage device of claim 9, wherein the first queue comprises a plurality of separate lists configured to receive unaligned portions of data for a respective one of the plurality of non-volatile memory areas and the controller is configured to store the unaligned portion in a list of the first queue associated with the non-volatile memory area to which the unaligned portion of data is directed.

11. The storage device of claim 10, wherein the controller is configured to write unaligned portions of data from the first queue in parallel to each of the plurality of non-volatile memory areas when the first queue contains a threshold amount of unaligned portions of data.

12. The storage device of claim 11, wherein the controller is further configured to write data from the first queue in parallel to an appropriate one or more of the plurality of non-volatile memory areas, regardless of whether the first queue contains unaligned data for all of the non-volatile memory areas, when an amount of unaligned data in the first queue reaches a predetermined threshold.

13. The storage device of claim 9, wherein the RAM comprises a RAM cache in the controller.

14. The storage device of claim 10, wherein the controller is configured to write unaligned data from each of the lists, in parallel, to each of the respective plurality of non-volatile memory areas in a first in first out (FIFO) manner.

15. The storage device of claim 10, wherein the non-volatile memory areas comprise separate banks of flash memory.

16. The storage device of claim 15, wherein the physical page comprises a metapage spanning one of the plurality of banks of flash memory.

17. The storage device of claim 11, wherein the second queue comprises a plurality of lists configured to receive the aligned portions of data for a respective one of the plurality of non-volatile memory areas and the controller is configured to store the aligned portion in a list of the second queue associated with the non-volatile memory area to which the unaligned portion of data is directed.

18. The storage device of claim 17, wherein the controller is further configured to write aligned portions of data from the second queue in parallel to each of the plurality of non-volatile memory areas when the controller detects a timeout condition.

19. The storage device of claim 18, wherein the controller is configured to only write data from one queue at a time for writing data to the plurality of non-volatile memory areas.

20. The storage device of claim 18, wherein the controller is configured to select data from one of the first queue or the second queue to permit parallel writing to each of the plurality of non-volatile storage areas regardless of the order the selected data was received in the first or second queue.

21. The storage device of claim 9, wherein the RAM comprises two data cache areas, one each for storing the first and second queues, wherein each data area comprises a size equal to or greater than a size necessary to hold an amount of data equal to that which the storage device is capable of writing to non-volatile memory in parallel.

* * * * *